(12) United States Patent
Canopy

(10) Patent No.: US 6,182,643 B1
(45) Date of Patent: Feb. 6, 2001

(54) INTERNAL COMBUSTION ENGINE WITH COOLING CIRCUIT

(75) Inventor: Donald D. Canopy, Rome, IL (US)

(73) Assignee: Caterpillar Inc., Peoria, IL (US)

(*) Notice: Under 35 U.S.C. 154(b), the term of this patent shall be extended for 0 days.

(21) Appl. No.: 09/494,490

(22) Filed: Jan. 31, 2000

(51) Int. Cl.[7] .................................................. F02B 33/00
(52) U.S. Cl. ............................................................. 123/542
(58) Field of Search ................................... 123/542, 556, 123/552, 527, 540

(56) References Cited

U.S. PATENT DOCUMENTS

| | | |
|---|---|---|
| 2,775,961 | 1/1957 | Petre . |
| 3,439,657 | 4/1969 | Gratzmuller . |
| 3,441,011 | 4/1969 | Karl . |
| 3,577,961 | 5/1971 | Deutschmann et al. . |
| 4,272,958 | 6/1981 | Waltrip . |
| 4,429,737 | 2/1984 | McManus et al. . |
| 4,480,439 | 11/1984 | Yamane . |
| 4,492,269 | 1/1985 | Jennings et al. . |
| 4,565,175 | 1/1986 | Kaye . |
| 4,683,725 | 8/1987 | Sugiura . |
| 5,054,457 | 10/1991 | Sakamoto . |
| 5,172,753 | * 12/1992 | Kadle et al. ........................... 123/542 |
| 5,375,580 | * 12/1994 | Stolz et al. ............................ 123/542 |
| 5,385,132 | * 1/1995 | Lehman ................................ 123/542 |
| 5,394,854 | * 3/1995 | Edmaier et al. ...................... 123/542 |

* cited by examiner

Primary Examiner—Marguerite McMahon
(74) Attorney, Agent, or Firm—Todd T. Taylor

(57) ABSTRACT

An internal combustion engine (10) comprises an engine block (12) having at least one combustion cylinder (18), an air intake port (56) and an exhaust port (58) each in communication with the combustion cylinder (18), a piston (16) reciprocatingly disposed within each combustion cylinder (18), and an exhaust stack (26) in communication with each exhaust port (58). A heat transfer system (28) has a circuit tube (32) with a first portion (34) in heat transfer relationship with the exhaust stack (26), a second portion (42) defining a heat conduction area, a flow valve (38) in the circuit tube (32), and a heat transfer agent within the circuit tube (32). A cooling system (30) has a circuit conduit (44) with a first section (52) defining a heat receiving area in thermal contact with the heat conduction area (42) of the heat transfer system (28). The cooling system (30) further has a second section (46) defining a cooling area, a restriction (54) in the circuit conduit (44) between the first section (52) and the second section (46) upstream of the second section (46), and a refrigerant within the circuit conduit (44).

16 Claims, 1 Drawing Sheet

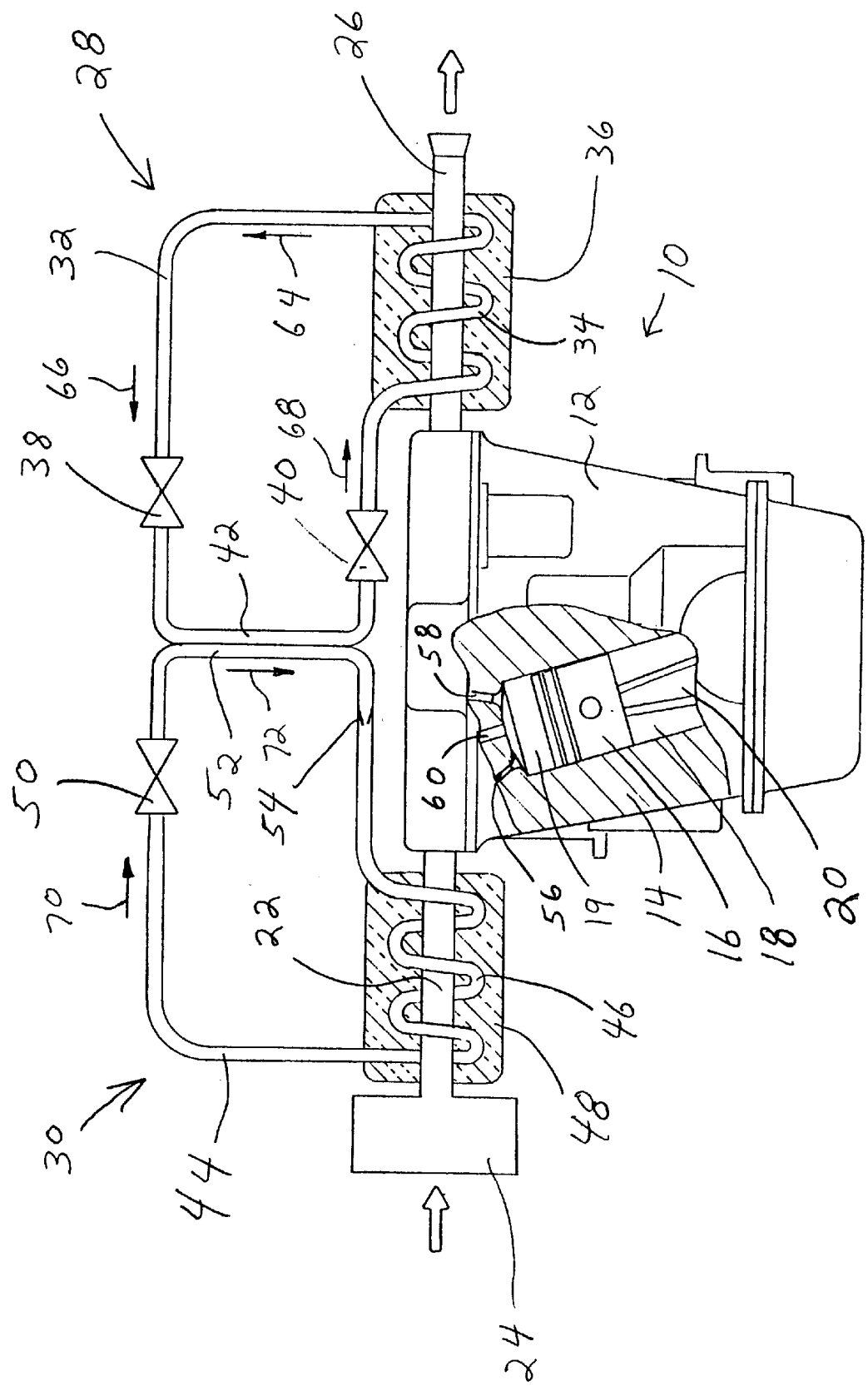

INTERNAL COMBUSTION ENGINE WITH COOLING CIRCUIT

TECHNICAL FIELD

The present invention relates to internal combustion engines and, more particularly, to cooling systems within internal combustion engines.

BACKGROUND ART

Reciprocating piston internal combustion engines include one or more pistons that are reciprocally disposed within corresponding combustion cylinders. The pistons are interconnected with each other through the use of a rotatable crankshaft. Reciprocation of the pistons causes rotation of the crankshaft.

An internal combustion engine utilizes air and fuel to create combustion within the various combustion cylinders. Combustion causes movement of the piston within the combustion cylinder which is transferred to the crankshaft and other moving parts of the engine for various purposes. The combustion process generates heat that is transferred throughout the engine.

In order to maintain engine life, it is known to remove as much heat as possible from the engine. It is also known that providing cooled intake air will aid in improved efficiency, cleaner combustion and engine cooling.

However, providing cooled intake air, or cooling of any kind, generally requires at least auxiliary energy and components. This solution is not favorable since it adds weight to the system.

In U.S. Pat. No. 3,439,657 entitled "Cooling Devices for Supercharged Internal Combustion Engines" issued to Gratzmuller on Apr. 22, 1969, there is disclosed a cooling device and process for supercharged internal combustion engines. The device and process utilizes the water cooling circuit of the engine. The supercharger air inlet is provided with a pair of serially arranged heat-exchangers to lower the temperature of the supercharger air. The first heat-exchanger receives cooling liquid from a liquid cooling circuit that includes the water jacket of the engine. The second heat-exchanger is located in the air inlet between the engine and the first heat-exchanger and forms the part of a separate liquid cooling circuit provided with a circulation pump and air-cooled radiator.

There is thus the problem of providing cooled intake air for an internal combustion engine without adding appreciable weight or complexity to the system.

The present invention is directed to overcoming one or more of the problems as set forth above.

DISCLOSURE OF THE INVENTION

In one aspect of the invention, an internal combustion engine comprises an engine block having at least one combustion cylinder, an air intake port and an exhaust port each in communication with the combustion cylinder. A piston is reciprocatingly disposed within each combustion cylinder with an exhaust stack in communication with each exhaust port. A heat transfer system has a circuit tube with a first portion in heat transfer relationship with the exhaust stack and a second portion defining a heat conduction area, and a flow valve in the circuit tube. A cooling system has a circuit conduit with a first section defining a heat receiving area in thermal contact with the heat conduction area of the heat transfer system and a second section defining a cooling area, and a restriction in the circuit conduit between the first section and the second section upstream of the second section.

In another aspect of the invention, an internal combustion engine comprises an engine block having a combustion cylinder, an air intake port in communication with the combustion cylinder, an exhaust port in communication with the combustion cylinder, a piston reciprocatingly disposed in the combustion cylinder, an air intake tube in communication with the air intake port, and an exhaust tube in communication with the exhaust port. A heat transfer circuit has a first section disposed about the exhaust tube, a second section defining a heat transfer area, and a one-way flow valve. A cooling circuit has a first portion in thermal transfer relationship with the second section of the heat transfer circuit, a second portion disposed about the air intake tube, and an orifice between the first portion and the second portion upstream of the second portion.

In yet another aspect of the invention, an internal combustion engine comprises an engine block with a combustion cylinder therein, an air intake port in communication with the combustion cylinder, and an exhaust port in communication with the combustion cylinder. A piston is reciprocatingly disposed in the combustion cylinder, while an exhaust stack is in communication with the exhaust port. A first thermal transfer circuit having ammonia therein includes a heat receiving coil disposed about the exhaust stack, a one-way valve, and a heat transfer section. A second thermal transfer circuit having a refrigerant therein includes a cooling coil, an orifice disposed upstream of the cooling coil, and a heat absorption section upstream of the orifice. The heat absorption section is in thermal transfer relationship with the heat transfer section, wherein the refrigerant is adapted to produce cooling in the cooling coil.

BRIEF DESCRIPTION OF THE DRAWINGS

The drawing shows an internal combustion engine in partial sectional view with a diagrammatic representation of heat exchange circuits for the engine in accordance with the principles of the present invention.

BEST MODE FOR CARRYING OUT THE INVENTION

Referring now to the drawing, there is shown and embodiment of an internal combustion engine 10 of the present invention. Internal combustion engine 10 includes an engine block 14 with a plurality of combustion cylinders of which only one such combustion cylinder 18 is shown. Each combustion cylinder reciprocatingly carries a piston of which only one such piston 16 is shown. Thus, the following description(s) relating to piston 16 and/or combustion cylinder 18 should be construed to cover the plurality of pistons and combustion cylinders within engine 10.

Piston 16 is pivotally coupled to connecting rod 20 and is reciprocal within combustion cylinder 18. Connecting rod 20 is coupled to a crankshaft (not shown) for translating the reciprocal piston motion to rotational motion. Piston 16 within combustion cylinder 18 defines combustion area 19. In communication with combustion area 19 is intake port 56 that is in communication with a typical fuel/air system, and exhaust port 58 that is in communication with various exhaust conduits. Fuel injector 60 injects the fuel/air mixture into combustion area 19 as is known in the art, and is compressed by piston 16 once the fuel enters therein via intake port 56. Compression of the fuel/air mixture within combustion area 19 by piston 16 creates combustion. Combustion gasses exit combustion area 19 via exhaust port 58. Engine 10 also includes various filters, conduits for oil, gas, air and the like, and other components that are typical of internal combustion engines. Engine 10 preferably includes a plurality of pistons, piston chambers, connecting rods, and intake/exhaust ports, as well as other various components as is typical. Various types of internal combustion engines as well as other engine types may utilize the principles of the present invention.

Engine 10 includes aftercooler 24 that is in fluid communication with air intake tube 22. Hot, compressed gas from the turbocharger (not shown) is received into aftercooler 24 which somewhat cools the compressed gas. Fuel for the combustion process within the various combustion cylinders is supplied in addition to the air from aftercooler 24 and intake tube 22. The various combustion cylinders are in fluid communication with intake tube 22 as is known in the art. Engine 10 also has exhaust output tube, pipe or stack 26 which is in fluid communication with the various combustion cylinders as is known in the art. The exhaust gas from the combustion cylinders is externally expelled through and from exhaust tube 26, as indicated by the large, outlined arrow. Exhaust tube 26 is made from a thermally conductive material such as metal to allow the heat from the exhaust gas to be conducted thereto.

In accordance with an aspect of the present invention, engine 10 includes first thermal exchange circuit 28 and second thermal exchange circuit 30. First thermal exchange circuit 28 is a heat transfer circuit that obtains heat through one portion of the circuit, and releases heat in another portion of the circuit. This is accomplished through a thermal transfer agent disposed within heat transfer circuit 28. Second thermal exchange circuit 30 is a cooling circuit that obtains heat through one portion of the circuit, and releases heat in another portion of the circuit. A gaseous transform agent is disposed within cooling circuit 30 which is caused to undergo a state change to create cooling.

Heat transfer circuit 28 is characterized by thermally conducting tube or conduit 32 in which is disposed a heat exchange/transfer agent that is capable of obtaining, carrying, and releasing heat. The exchange agent may be a liquid that remains a liquid in normal ambient temperatures to temperatures ranging from 600° to 700° C., such as, preferably ammonia ($NH_4$). Tube 32 may be formed from any suitable thermally conducting metal or other type of suitable thermally conducting material. Conduit 32 includes heat obtaining portion or coil section 34 that is coiled or wrapped around exhaust stack 26. Coil section 34 is in a thermal relationship with exhaust stack 26 such that heat absorbed by exhaust stack 26 is conducted to coil section 34. Generally, the closer that coil 34 is to exhaust stack 26, the greater the heat exchange that takes place from exhaust stack to coil 34. Preferably, insulation 36 surrounds coil section 34 to aid in the transfer of heat emanating from exhaust stack to coil 34. As well, coil 34 conducts the heat it receives to the heat transfer agent disposed within circuit 28.

First thermal exchange circuit 28 also includes first one-way valve 38 and second one-way valve 40 with thermal exchange portion or heat conduction section 42 disposed therebetween. Heat conduction section 42 is shown as a straight section of tube, but may be any configuration to allow efficient heat conduction from the transfer agent within circuit 28 to the heat conduction area 42 defined by the particular heat conduction section. Also, while two one-way valves 38 and 40 are shown in the drawings, it should be understood that only one one-way valve may be sufficient. Further, more than two one-way valves may be used depending on the desired characteristics of heat exchange circuit 28.

Cooling circuit 30 is characterized by thermally conducting tube or conduit 44 in which is disposed a cooling or refrigerant agent that is capable of utilizing heat and pressure to produce cold. Such a cooling agent may be freon. Conduit 44 may be formed from any suitable thermally conducting metal or other type of suitable thermally conducting material that can also withstand pressures associated with liquid and gaseous freon. Conduit 44 includes coil section 46 that is coiled or wrapped around intake tube 22. Preferably, insulation 48 surrounds coil section 46 to aid in the retention of cold emanating from coil section 46. Cooling circuit 30 also includes one-way valve 50 and restriction/aperture/orifice 54 with thermal exchange portion 52 disposed therebetween. While only one one-way valve is shown and is sufficient in second thermal exchange circuit 30, it should be understood that several one-way valves may be used. It should also be understood that the terms "first" and "second" with respect to the thermal exchange circuits, as well as the one-way valves is only a matter of choice in distinguishing one thermal exchange circuit from the other.

Thermal exchange portion 42 of heat transfer circuit 28 is thermally coupled to thermal exchange portion 52 of cooling circuit 30 in a manner to obtain the best thermal exchange or heat conduction therebetween. Such thermal coupling may include the welding of tube portions 42 and 52 together, and/or maintaining them in abutting relationship. Further, thermal exchange portions 42 and 52 may take other shapes and forms in order to achieve the most efficient thermal exchange between the two circuits.

Heat transfer circuit 28 receives heat from exhaust stack 26 that is transferred to second thermal exchange or cooling circuit 30 through exchange portions 42 and 52. Cooling circuit 30 uses the heat from heat transfer circuit 28 to produce cooling in cooling circuit 30. The cooling may be used for a variety of cooling applications.

Specifically, and with reference to heat transfer circuit 28, as exhaust stack 26 gains heat by conduction from the exhaust gas flowing therethrough, coil section 34 gains heat by conduction from exhaust stack 26. The heat transfer agent within tube 32 gains heat by conduction from coil section 34. Heat imparted to the transfer agent within the closed heat transfer circuit 28 causes the heat transfer agent therein to expand and thus create motion or circulation. One-way valves 38 and 40 cause the circulation to flow in one direction as indicated by arrows 64, 66, and 68. At the area around arrows 64 and 66, the transfer agent has its maximum heat capacity. After flowing through tube portion or heat transfer area 42 the heated transfer agent conducts heat to tube portion or heat obtaining area 52 and thus has it minimum heat capacity around arrow 68.

With reference to cooling circuit 30, the gaseous cooling agent within tube 44 and around the area of arrow 72 obtains heat by conduction from tube portion 42. The addition of heat causes expansion in the cooling agent thereby creating motion or circulation that is controlled in flow direction 70 by one-way valve 50. As the heated cooling agent, in gaseous form, encounters restriction 54 there is an increase in pressure. The increased pressure causes the cooling gaseous agent to become a liquid. After the now liquid cooling agent flows through restriction 54, immediate expansion takes place, and the liquid cooling agent becomes a gas cooling agent absorbing heat and producing cooling within coil section 46. Thereafter, the gaseous cooling agent flows as per arrow 70.

INDUSTRIAL APPLICABILITY

During operation of internal combustion engine 10, heat from combustion gasses expelled or exhausted from combustion cylinders 18 and directed out of exhaust pipe 26 heats up exhaust pipe 26 to temperatures around 600°–700° C. Coil section 34, being in thermal exchange relationship with exhaust pipe 26 becomes heated through conduction. The liquid ammonia within heat transfer circuit 28 is likewise conductively heated by coil section 34. Heat imparted to the ammonia causes expansion and motion of the ammonia, which tries to circulate within the circuit. One-way valves 38 and 40, however, permit the circulation to flow in only one direction as indicated by the arrows. The liquid ammonia within first thermal exchange circuit 28 thus utilizes heat generated by the engine during operation for its operation. No additional energy is required.

Tube portion 42 is in thermal exchange relationship with tube portion 52 of cooling circuit 30. As tube portion 52 heats up from conduction by tube portion 42, the gaseous freon begins to expand and circulate within the circuit. The circulating freon flows in only one direction as indicated by the arrows because of one-way valve 50. As the heated freon flows through aperture or orifice 54, the pressure and temperature of the freon drop such that the temperature is between 20°–40° C. below zero (−20° to −40° C.). The cooled freon gas then circulates through coil 46 or other network of tubes and/or coils to provide cooling through conduction. The present dual heat transfer or thermal exchange cycle linked by a heat exchanger within the internal combustion engine, continues to produce cooling without additional energy input.

Coil 46 may be placed in the engine oil cooler to aid in cooling the engine oil. As well, coil 46 could pass through the hydraulic oil line to aid in cooling the hydraulic oil therein. In another instance, coil 46 may consist of a series or network of tubes enclosed in an insulated container. Air passages at either end of the insulated container allow for a flow of air through the container which blow over the coil or network of tubes which cools the flowing air. A fan or blower at one air passage forces the air through the insulated container which exits the other air passage to provide cooled air such as in air conditioning. In this case, however, no additional fuel is spent in providing cooled air above that which is used by the engine. Only a small amount of electricity is expended by the fan.

It is an advantage of the present invention that cooler combustion air is provided to the air intake of an internal combustion engine.

Other aspects, objects and advantages of this invention can be obtained from a study of the drawings, the disclosure and the appended claims.

What is claimed is:

1. An internal combustion engine, comprising:
   an engine block having at least one combustion cylinder, an air intake port and an exhaust port each in communication with said combustion cylinder;
   at least one piston, each said piston reciprocatingly disposed within a corresponding said combustion cylinder;
   an exhaust stack in communication with each said exhaust port;
   a heat transfer system having a circuit tube with a first portion in heat transfer relationship with said exhaust stack and a second portion defining a heat conduction area, a flow valve in said circuit tube, and a heat transfer agent within said circuit tube; and
   a cooling system having a circuit conduit with a first section defining a heat receiving area in thermal contact with said heat conduction area of said heat transfer system and a second section defining a cooling area, a restriction in said circuit conduit between said first section and said second section upstream of said second section, and a refrigerant within said circuit conduit.

2. The internal combustion engine of claim 1, wherein said first portion of said circuit tube of said heat transfer system is a coil disposed about said exhaust stack, and further comprising insulation disposed about said first portion of said circuit tube of said heat transfer system.

3. The internal combustion engine of claim 1, wherein said heat transfer agent is ammonia.

4. The internal combustion engine of claim 1, wherein said second portion comprises a straight portion of circuit tube, said first section comprises a straight section of circuit conduit, and said straight portion of said circuit tube is longitudinally coupled to said straight section of said circuit conduit.

5. The internal combustion engine of claim 1, wherein said refrigerant agent is freon and said second section is a coil of said circuit conduit.

6. The internal combustion engine of claim 1, including an air intake tube in communication with said air intake port, and wherein said second section is a coil of said circuit conduit disposed about said air intake tube.

7. An internal combustion engine, comprising:
   an engine block having a combustion cylinder, an air intake port in communication with said combustion cylinder, and an exhaust port in communication with said combustion cylinder;
   a piston reciprocatingly disposed in said combustion cylinder;
   an air intake tube in communication with said air intake port;
   an exhaust tube in communication with said exhaust port;
   a heat transfer circuit having a first section disposed about said exhaust tube, a second section defining a heat transfer area, a heat transfer agent disposed within said heat transfer circuit, and a one-way flow valve; and
   a cooling circuit having a first portion in thermal transfer relationship with said second section of said heat transfer circuit, a second portion disposed about said air intake tube, a refrigerant disposed within said cooling circuit, and an orifice between said first portion and said second portion upstream of said second portion.

8. The internal combustion engine of claim 7, wherein said heat transfer agent is ammonia and said heat transfer circuit is configured to receive heat proximate said first section, transfer the received heat to said second section, and liberate the received heat proximate said second section, and said cooling circuit is configured to receive heat proximate said first portion and producing cooling proximate said second portion after said refrigerant flows through said orifice.

9. The internal combustion engine of claim 7, wherein said first section is a coil, said second portion is a coil, and said first portion is abutting said second section.

10. The internal combustion engine of claim 9, including:
    first insulation disposed about said first section; and
    second insulation disposed about said second portion.

11. The internal combustion engine of claim 9, wherein said first portion is a straight portion of the cooling circuit, said second section is a straight section of the heat transfer circuit, and said straight portion is welded to said straight section.

12. An internal combustion engine, comprising:
    an engine block with a combustion cylinder therein, an air intake port in communication with the combustion cylinder, and an exhaust port in communication with the combustion cylinder;

a piston reciprocatingly disposed in the combustion cylinder;

an exhaust stack in communication with the exhaust port;

a first thermal transfer circuit having ammonia therein and including a heat receiving coil disposed about said exhaust stack, a one-way valve, and a heat transfer section; and a second thermal transfer circuit having a refrigerant therein and including a cooling coil, an orifice disposed upstream of said cooling coil, and a heat absorption section upstream of said orifice, said heat absorption section in thermal transfer relationship with said heat transfer section, wherein said refrigerant is adapted to produce cooling in said cooling coil.

13. The internal combustion engine of claim 12, including:

first insulation disposed about said heat receiving coil; and second insulation disposed about said cooling coil.

14. The internal combustion engine of claim 12, wherein said ammonia is adapted to receive heat via said heat receiving coil, flow within said first thermal transfer circuit upon receipt of heat, and liberate the received heat proximate said heat transfer section, and said refrigerant is adapted to receive heat proximate said heat absorption section, flow within said second thermal transfer circuit upon absorption of heat, and producing cooling proximate said cooling coil after said refrigerant flows through said orifice.

15. The internal combustion engine of claim 14, wherein said refrigerant is freon.

16. In an internal combustion engine having an engine block with at least one combustion cylinder, an air intake port in communication with each combustion cylinder, an air intake tube in communication with each air intake port, an exhaust port in communication with each combustion cylinder, a piston reciprocatingly disposed within each combustion cylinder, and an exhaust stack in communication with each exhaust port, a method of cooling intake air comprising:

providing a heat transfer system having a circuit tube with a first portion in heat transfer relationship with the exhaust stack for receiving heat from the exhaust stack and a second portion defining a heat conduction area to liberate heat, a heat transfer agent within the circuit tube to transfer heat received at the first portion to the second portion by flowing within the circuit tube, and a flow valve in the circuit tube to control the flow of the heat transfer agent; and providing a cooling system having a circuit conduit with a first section defining a heat receiving area in thermal contact with the heat conduction area of the heat transfer system for receiving heat from the heat transfer system and a second section defining a cooling area in cooling relationship with the air intake tube for cooling the air within the air intake tube, a refrigerant within the circuit conduit for receiving heat from the heat receiving area to cause the refrigerant to compress into a liquid and flow within the circuit conduit, and a restriction in the circuit conduit between the first section and the second section upstream of the second section to cause the refrigerant to evaporate into a gas and provide cooling in the second section.

* * * * *